United States Patent [19]
Delacour et al.

[11] Patent Number: 5,184,682
[45] Date of Patent: Feb. 9, 1993

[54] DEVICE ALLOWING MEASUREMENTS OR INTERVENTIONS TO BE CARRIED OUT IN A WELL, METHOD USING THE DEVICE AND APPLICATIONS OF THE DEVICE

[76] Inventors: Jacques Delacour, 18, rue Pierre Guerin, 75016 Paris; Francois Dawans, 1, rue Pasteure; Michel Huvey, 2, avenue des Pinson, both of 78380 Bougival, all of France

[21] Appl. No.: 354,876
[22] Filed: May 22, 1989
[30] Foreign Application Priority Data
May 20, 1988 [FR] France .................... 88 06828
[51] Int. Cl.⁵ .............................. E21B 23/10
[52] U.S. Cl. ........................ 166/385; 166/65.1
[58] Field of Search ............ 166/385, 250, 65.1

[56] References Cited

U.S. PATENT DOCUMENTS

| | | |
|---|---|---|
| 4,024,913 | 5/1977 | Grable . |
| 4,452,314 | 6/1984 | Zion .................. 166/385 X |
| 4,585,066 | 4/1986 | Moore et al. .......... 166/385 |
| 4,681,169 | 7/1987 | Brookbank, III ...... 166/385 |
| 4,685,516 | 8/1987 | Smith et al. .......... 166/65.1 |
| 4,729,429 | 3/1988 | Wittrisch ............ 166/65.1 |

Primary Examiner—William P. Neuder
Attorney, Agent, or Firm—Antonelli, Terry, Stout & Kraus

[57] ABSTRACT

A device for carrying out at least one of measurements and interventions in a drilled well, with the device including a rod and an instrument for at least one of measuring and intervention disposed at a lower end of the rod. The rod is flexurally elastic and compressively rigid and includes at least one line for carrying energy or information with such line being, for example, an electric, fluid or optical line. The rod is constructed so as to be wound onto at least one winch and is fashioned of one of a composite or polymer non-composite material.

19 Claims, 3 Drawing Sheets

DEVICE ALLOWING MEASUREMENTS OR INTERVENTIONS TO BE CARRIED OUT IN A WELL, METHOD USING THE DEVICE AND APPLICATIONS OF THE DEVICE

BACKGROUND OF THE INVENTION

The present invention relates to a device, an application of this device, and a method using this device, allowing measurements and/or interventions to be made in a well at the level of the surrounding formations.

The invention is particularly applicable when measurements and/or interventions are to be made in geological formations traversed by a well. In this case, the measurements carried out may include recording the well-bottom pressure and temperature, measurement (focussed or unfocussed) of the electrical resistivity of the formations, and acoustic, nuclear, etc. measurements.

These measurement and intervention techniques are well known to individuals skilled in the art and will not be described here in further detail.

The present invention is particularly designed for making measurements or interventions in a well producing petroleum effluents, with the well preferably having tubes or drains which delimit its walls.

Patent EP-A-0/256.601 describes, for example, a method and a device for drilling into the ground with the aid of an assembly consisting of two concentric tubes made of metal, rigid and unreeled from a winch by plastic deformation of the material of the tubes.

U.S. Pat. No. 4,685,516 describes a device for measurements or interventions in a well having an instrument disposed at the lower part of a hollow tube initially wound onto a winch which is made to rotate to move the instrument in a well.

The tubes described EP-A-0/256.601 and U.S. Pat. No. 4,685,816 are made of metal and have low flexibility to facilitate movement of the instrument. This flexibility produces plastic deformations upon winding onto the winch or unwinding from the winch. The electrical conductor they may contain is disposed in the hollow cavity inside the tube. In addition to the tube being relatively heavy, a further problem arises in that emplacement a conductor can only be carried out when the tube is wound up.

While Patent FR-B-1,249,236 describes a flexible steel tube usable to drill the ground, a disadvantage of this flexible steel. Tube resides in the fact that it is very expensive to manufacture.

All tubes traditionally used are vulnerable to corrosion and are not particularly suitable for reducing friction with the well wall when the instrument moves, nor even to resist this friction.

The drawbacks of the devices according to the prior art are considerably reduced, if not eliminated, by the use of the device according to the present invention to carry out measurements or interventions in a drilled well, with the device having a rod or shaft connected to a measuring or intervention instrument, disposed at a lower end of the rod.

According to device of the present invention, the rod is, in particular, flexurally elastic and rigid in compression, with the rod having at least one line designed for carrying energy or information such as an electric, fluid, or optical line, and with the rod being constructed so as to be wound onto at least one winch and comprising a composite or polymer non-composite material.

The composite material may be, for example, glass, carbon, or polyaramide fibers such as Kevlar which is a registered trademark of Dupont de Nemours, these fibers being embedded in a thermoplastic or thermosetting resin matrix.

The polymer material without its reinforcing elements may be chosen from the following group of polymers: polyamide, vinylidene polyfluoride, and high-density cross-linked polyethylene.

The rod may be essentially solid and be constructed so as to withstand twisting. When the rod has a neutral fiber along which no tractive or compressive force appears when said rod is flexed, the carrying line may be disposed substantially in the vicinity of the neutral fiber.

The nature of the material of which the outer part of the rod consists may be such so as to decrease friction between the rod and the well wall.

The rod may be made by a continuously producing machine, particularly by extrusion or by pultrusion.

The rod may have several energy or information carrying lines.

The rod may be hollow and the line may be embedded in the thickness of said rod. The outer part of the rod may include an anti-abrasion agent.

The above and other objects, features and advantages of the present invention will become more apparent from the following description when taken in connection with the accompanying drawings which show, for the purpose of illustration only, several embodiments in accordance with the present invention.

DETAILED DESCRIPTION

Figure 1:
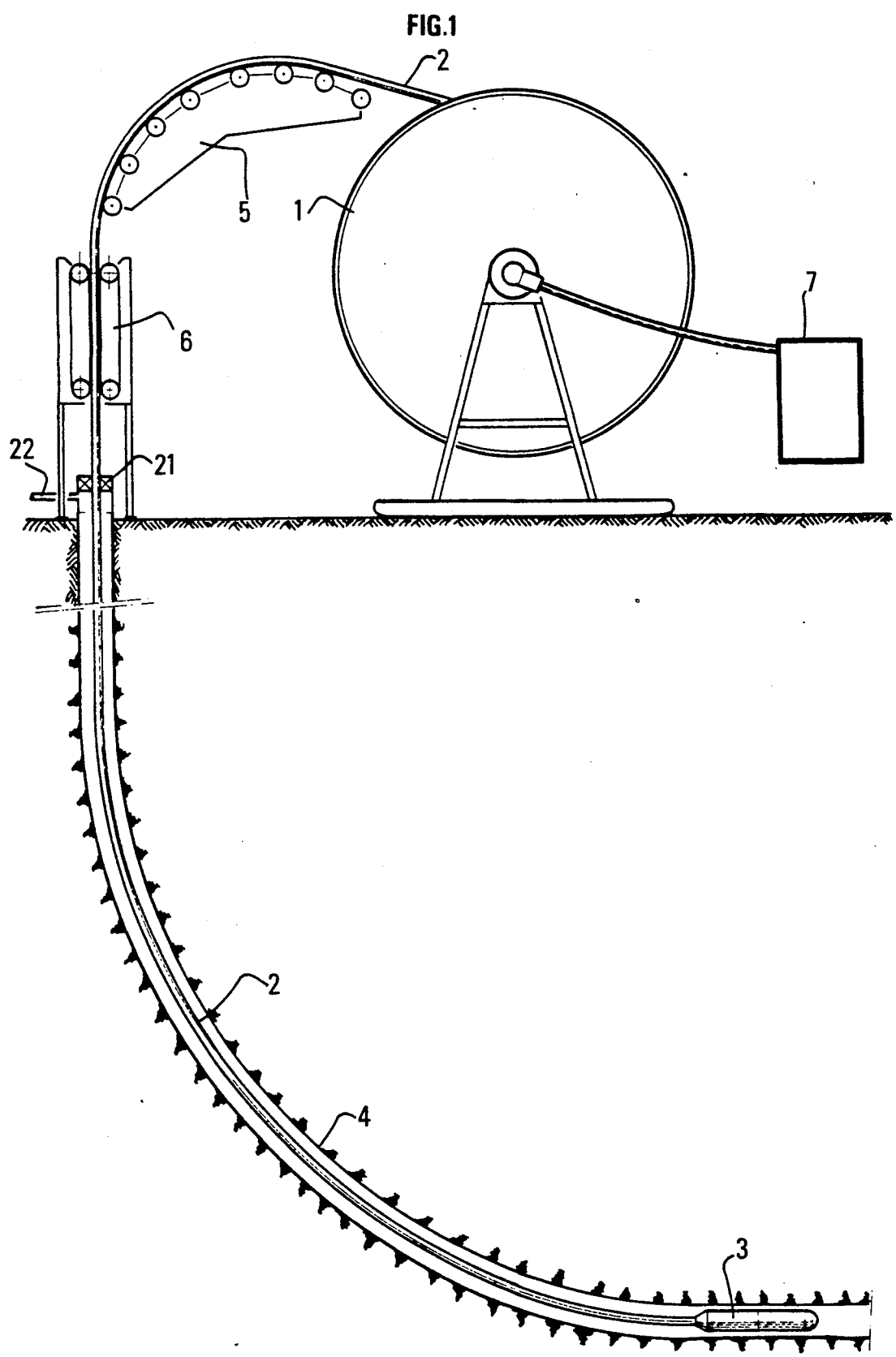
FIG. 1 is a schematic view of a device constructed in accordance with the present invention disposed in a well.

Referring now to the drawings wherein like reference numerals are used throughout the various views to designate like parts and, more particularly, to FIG. 1, according to this figure, a reel or winch 1 has a rod 2 wound thereon, with the rod 2 being adapted to be used for moving an instrument 3 in a well 4 for enabling a carrying out of measurements or interventions in one or more zones of the well 4. The rod 2 is very flexible and exits the reel 1 by passing over a return device 5 composed of a plurality of pulleys which are constructed so as to position the rod 2 on an axis of the well 4 regardless of the position of the reel 1 and degree to which the reel 1 is full. The flexible rod 2 passes over the return device 5 and through pushing and pulling means 6 designed to push the rod 2 into the well 4, hold the rod 2 in the well 4, or remove the rod 2 from the well 4.

The pulling and pushing means 6 may, for example, include two rubber belts adapted to squeeze the flexible rod 2 and move the flexible rod in a desired direction to enable a manipulation of the flexible rod 2. The flexible rod 2 is resistant to compression so as to allow the instrument 3 to be pushed and, for example, may be made of a single element or a limited number of individual elements.

Rod 2 has at least one line designed for carrying energy or information such as one (or more) electric, fluid, or optic line(s) which allow the instrument 3 disposed in the well 4 at the lower end of the rod 2 to be connected to the surface where the upper end of rod 2 is located. At this upper end are connected, possibly via a rotating connector, devices 7 for controlling or commanding the instrument 3. The rod 2 may be made of a composite material with reinforcing fibers made of glass, carbon, or polyaramide embedded in a thermoplastic or thermosetting resin matrix. This composite material may advantageously be made of glass fibers embedded in an epoxy resin.

The nature of the matrix and the fibers may be judiciously chosen to decrease friction and wear due to friction between rod 2 and the wall of well 4 during the movements of instrument 3. The line for carrying energy and information is advantageously embedded in the rod 2 at the time of manufacturing of the rod 2.

Rod 2 may also be made of a polymer material that withstands, in particular, the mechanical stresses during use and the thermal and chemical stresses encountered in the well 4. It has been found that thermoplastic polymers of the polyamide, vinylidene polyfluoride, or high-density cross-linked polyethylene type allow a light, corrosion-resistant rod according to the invention to be made.

To make rod 2, a continuously producing machine may be used, or a machine of a type allowing the carrying line or lines to be embedded in the rod. The techniques known as extrusion or pultrusion may be used.

Extrusion and pultrusion are the names for the processes whereby a malleable material is pushed by a press into a die or drawn out from the exit of a die. Rod 2 may be full (or solid). It may also be hollow and the carrying line may be embedded in the rod 2.

Anti-abrasion agents designed to reduce wear on rod 2 and/or the well wall may advantageously be added to the composite or polymer material of which the rod 2 is made.

Rod 2 may have means allowing it to withstand twisting forces, such as a reinforcing braid disposed in the vicinity of the periphery of the rod 2.

The upper part of well 4 has means for sealing the well 4 and providing a seal with rod 2 which allow instrument 3 to be held in the well 4 or instrument 3 to be moved when the instrument 3 is connected to the surface of the ground by rod 2. An arrangement of this kind is used when the well 4 is in production, when a pipe 22 allows the effluent products to be evacuated.

Figure 2:
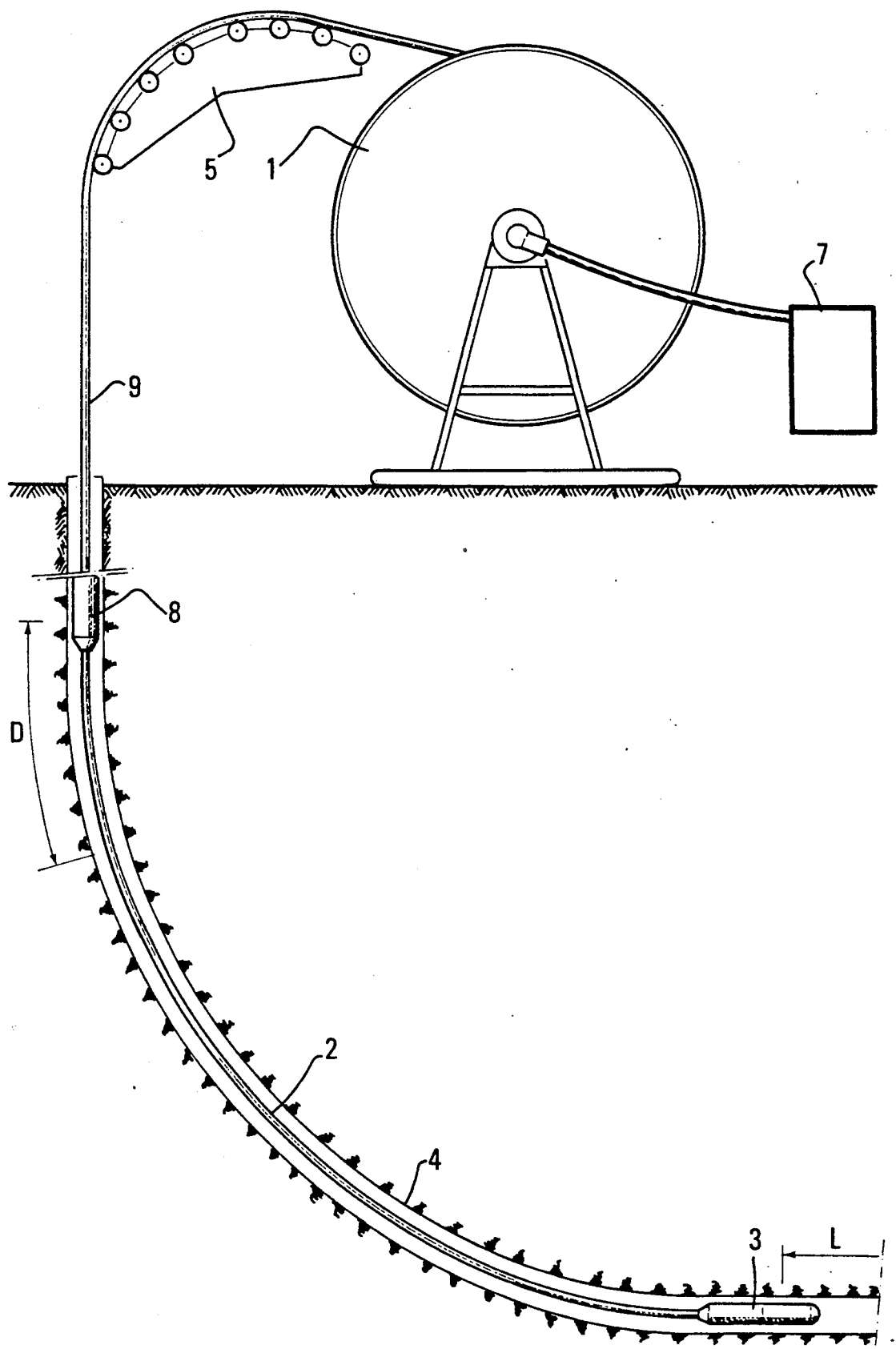
FIG. 2 is a schematic view of another embodiment of a device constructed in accordance with the present invention disposed in a well.

As shown in FIG. 2, the rod 2 connects instrument 3 to winch 1 located at the surface, with the rod 2 only being disposed between the instrument 3 and a drill collar 8 designed to compress rod 2, in order to cause instrument 3 to advance in the well 4. The drill collar 8 is connected to the surface of the ground by a flexible element 9 which can be a rod like that connecting drill collar 8 to instrument 3, or a cable provided with conductors, optical lines, or fluid lines.

In this way, in normal service, only the rod 2 disposed between drill collar 8 and instrument 3 is subjected to compression, while flexible element 9 is only subjected to traction. this arrangement is particularly advantageous in that the transverse dimensions of the flexible element 9 may be reduced thereby lowering the cost of the measuring or intervention device Flexible element 9, like rod 2, is wound on winch 1 and unwound from the winch via return element 5, the drill collar being removed from rod 2 and flexible element 9 to permit winding. It is also possible to use a drill collar 8 designed to be wound onto winch 1.

When adapted to measurements and interventions in sharply slanting or even horizontal wells, the length of rod 2 will be such that the distance D over which the drill collar 8 can move is at least equal to a length L of the zone to be explored.

The manipulation of instrument 3, or the information therefrom, are carried through rod 2, flexible element 9, and possibly drill collar 8, by the carrying lines or conductors thereof up to the surface where the control and command apparatus 7 of instrument 3 is located.

Advantageously, the rod 2 is made in one piece, for example, 1000, 2000, or 3000 meters long, but it will not be a departure from the scope of the invention to use as this rod 2 a restricted number of sections assembled to each other.

Figure 3:
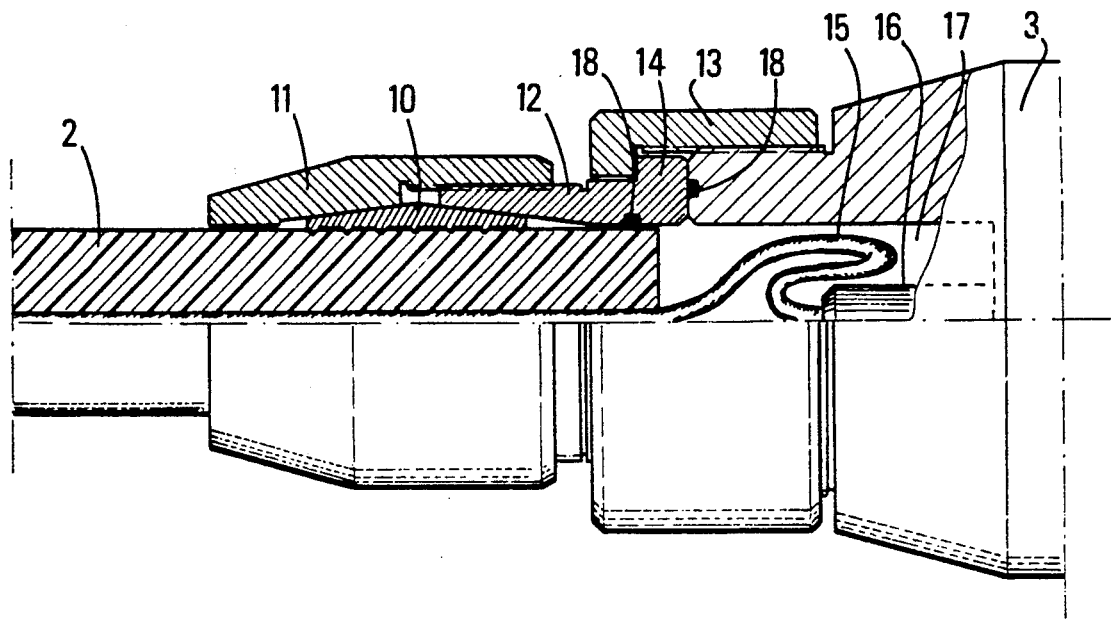
FIG. 3 is a partial longitudinal cross-sectional view of a link between a lower end of a rod and an instrument for making measurements or interventions in a device constructed in accordance with the present invention.

As shown in FIG. 3, a mechanical link between the rod 2 and the instrument 3, respectively having, for example, diameters of 25 millimeters and 75 millimeters, is ensured by anchoring a twice tapered sleeve 10 on rod 2, with the anchoring being effected by cooperation of nuts 11 and 12 with conical bores which press sleeve 10 against the rod 2. The anchoring assembly 10, 11, 12 being is attached to the body of instrument 3 by a nut 13 with a collar cooperating with a collar 14 integral with the anchoring assembly, especially the nut 12.

The electrical link between carrying line 15 and instrument 3 is provided by a female connector 16 cooperating with a sealed electrical terminal on the instrument. A female connector land terminal usable for this connection are available, for example, from the Deutsch Company, part number 9701.

In order especially to avoid electrical losses at the connection, space 17 between the end of rod 2 and instrument 3 is filled with an insulating fluid such as silicone grease, and is confined by sealing means such as O-rings 18.

Figure 4:
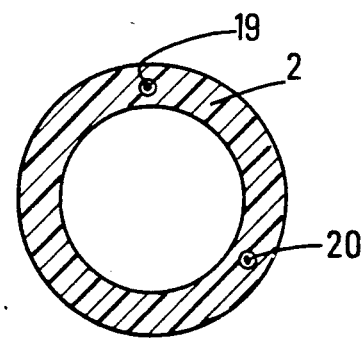
FIG. 4 is a cross-sectional view of a hollow rod constructed in accordance with the present invention having carrying lines.

In FIG. 4, which shows in cross section a variant of the rod according to the invention, the rod 2 is hollow and has one or more electrical conductors, more generally at least one carrying line embedded in the thickness of the rod. This particular arrangement in particular allows the flexural inertia of the rod to be increased by optimizing the material used, allows the hollow center part to be used for a fluid, and possible an operating fluid to be circulating such as drilling mud. Carrying lines 19, 20 may be disposed symmetrically or asymmetrically in the rod 2.

We claim:

1. Device for carrying out at least one of measurements and interventions in a drilled well, the device comprising:

a flexurally elastic and compressively rigid rod made of one of a composite and polymer non-composite material, said rod being adapted to be pushed into the drilled well and to be wound onto at least one reel;

an instrument for at least one of measuring and intervention disposed at a lower end of said rod; and at least one line means for carrying at least one of energy and information embedded in said rod.

2. Device according to claim 1, wherein said rod is substantially solid.

3. Device for carrying out at least one of measurements and interventions in a drilled well, the device comprising:

a substantially solid flexurally elastic and compressively rigid rod made of one of a composite and polymer non-composite material, said rod being adapted to be pushed into the drilled well and to be wound onto at least one reel, said rod including a neutral fiber along which no tractive or compressive force appears once said rod is flexed;

an instrument for at least one of measuring and intervention disposed at an end of said rod; and at least one line means for carrying at least one of energy and information embedded in said rod, said line means being disposed substantially in a vicinity of said neutral fiber.

4. Device according to claim 1, further comprising means disposed in said rod for withstanding twisting of said rod.

5. Device for carrying out at least one of measurements and interventions in a drilled well, the device comprising:

a flexurally elastic and compressively rigid rod made of a composite material, said rod being adapted to be pushed into the well and to be wound onto at least one reel;

an instrument for at least one of measuring and intervention disposed at a lower end of said rod;

at least one line means for carrying at least one of energy and information;

means disposed in said rod for withstanding a twisting of said rod, and wherein the composite material is composed of at least one of glass, carbon, and polyaramide fibers embedded in one of a thermoplastic and thermosetting resin matrix.

6. Device according to claim 5 wherein said composite material is composed of glass fibers embedded in an epoxy resin.

7. Device according to claim 4, wherein the rod is made of the polymer non-composite material without reinforcing elements, the polymer non-composite material being selected from a polymer group consisting of polyamide, vinylidene polyfluoride, and high-density cross-linked polyethylene.

8. Device according to claim 4, wherein at least an outer surface of the rod is composed of a material for diminishing friction between said rod and a wall of the drilled well.

9. Device according to claim 1 to 8, wherein said rod is made by one of an extrusion and pultrusion process.

10. Device for carrying out at least one of measurements and intervention, the device comprising:

a hollow flexurally elastic and compressively rigid rod made of one of a composite and polymer non-composite material, said rod being adapted to be pushed into the drilled well and wound onto at least one reel;

an instrument for at least one of measuring and intervention disposed at an end of said rod;

at least one line means embedded in a wall thickness of said rod for carrying at least one of energy and information.

11. Device according to claim 1, wherein at least an outer part of said rod contains an anti-abrasion material.

12. Process for carrying out at least one of measurements and interventions in a drilled well, the device including a flexurally elastic and compressively rigid rod made of one of a composite and polymer non-composite material, and an instrument for at least one of measuring an intervention disposed at a lower end of said rod, and at least one line for carrying at least one of energy and information embedded in the rod, the process comprising the steps of:

winding the rod on a reel;

unwinding the rod from the reel; and pushing the rod into the drilled well so as to place the rod in said drilled well by subjecting said rod substantially only to elastic deformation.

13. A device for carrying out at least one of measurements and interventions in a drilled well producing petroleum effluents, the device comprising a flexurally elastic compressively rigid rod made of one of a composite and polymer non-composite material, said rod being adapted to be pushed into the drilled well and to be wound onto and unwound from at least one reel;

an instrument for at least one of measuring and intervention disposed at a lower end of said rod; and at least one line means for carrying at least one of energy and information embedded in said rod.

14. Device according to claim 3, wherein said line means includes one of an electric, fluid, and optical line.

15. Device according to claim 13, further comprising means disposed in said rod for withstanding twisting of said rod.

16. Device according to claim 15, wherein the composite material is composed of at least one of glass, carbon and polyaramid fibers embedded in one of a thermal plastic and thermal setting resin matrix.

17. Device according to claim 15, wherein the rod is made of the polymer non-composite material without reinforcing elements, the polymer non-composite material being selected from a polymer group consisting of polyamid, vinylidene polyfluoride, and a high-density cross-linked polyethylene.

18. Device according to claim 15, wherein at least one outer surface of the rod is composed of a material for diminishing friction between said rod and a wall of the drilled well.

19. Device according to one of claims 15, 16, 17 or 18, wherein said rod is made by one of an extrusion and pultrusion process.

* * * * *